United States Patent Office 3,435,000
Patented Mar. 25, 1969

3,435,000
ORGANOPOLYSILOXANE COMPOSITIONS
Ben A. Bluestein, Schenectady, N.Y., assignor to General Electric Company, a corporation of New York
No Drawing. Filed Nov. 1, 1967, Ser. No. 679,653
Int. Cl. C08g 47/00, 51/56
U.S. Cl. 260—45.75                9 Claims

ABSTRACT OF THE DISCLOSURE

Organopolysiloxane compositions convertible to the cured solid elastic state are provided comprising organopolysiloxane polymer having cyanoalkyl radicals attached to silicon and an effective amount of zinc carbonate. Elastomers obtained from the organopolysiloxane compositions show improved resistance to swell in organic solvents and resistance to degradation in hot oil.

---

The present invention relates to elastomer forming organopolysiloxane compositions. More particularly, the present invention relates to organopolysiloxane compositions comprising organopolysiloxane polymer having cyanoalkyl radicals attached to silicon and zinc carbonate.

Prior to the present invention, organopolysiloxane compositions comprising organopolysiloxane polymer having cyanoalkyl radicals attached to silicon provided for organopolysiloxane elastomers showing superior resistance to swell when immersed in organic solvents. For example, as shown in French Patent 1,321,661, elastomers derived from organopolysiloxanes free of cyanoalkyl radicals which were immersed in JP-4, showed a volume increase of 100%, as compared to a 6½% increase for elastomers derived from organopolysiloxane polymer composed of up to about 60 mole percent of chemically combined methyl-$\beta$-cyanoethylsiloxy units, and 40 mole percent of dimethylsiloxy units. Experience has shown, however, that although organopolysiloxane polymers having cyanoalkyl radicals attached to silicon provide for elastomers having improved resistance to solvent swell, such elastomers often degrade completely when immersed in hydrocarbon oil at elevated temperatures for an extended period of time. For example, organopolysiloxane polymers having cyanoalkyl radicals attached to silicon have been employed to make oil seals for automobile transmissions. However, due to the chemical degradation of the oil at elevated temperatures over extended periods of time, degradation products of the oil often revert or break down the organopolysiloxane polymer. As a result, organic polymers often have been preferred over organopolysiloxane polymers to make oil seals.

The present invention is based on the discovery that when an effective amount of zinc carbonate is utilized in combination with organopolysiloxane polymers having cyanoalkyl radicals attached to silicon, organopolysiloxane elastomers derived from such polymers, show significantly improved resistance to the effects of reversion when contacted with hot oil at elevated temperatures.

There is provided by the present invention, organopolysiloxane compositions comprising (1) 100 parts of an organopolysiloxane consisting essentially of from 10 to 95 mole percent of organosiloxy units consisting essentially of diorganosiloxy units of the formula, (1)          $R_2SiO$ chemically combined with from 5 to 90 mole percent of cyanoalkylsiloxy units, consisting essentially of organocyanoalkylsiloxy units of the formula, (2)          $(R'')_aR'_{2-a}SiO$ and (2) 0.1 to 10 parts of zinc carbonate, where $a$ is a whole number equal to 0 or 1, R is a member selected from the class consisting of monovalent hydrocarbon radicals and halogenated monovalent hydrocarbon radicals, R' is selected from cyanoalkyl radicals, and R'' is a member selected from the class consisting of R radicals and R' radicals, where the average of the sum of R radicals and R' radicals, per silicon atom, of said organopolysiloxane, has a value equal to from 1.95 to 2.01 inclusive.

Radicals included by R of Formula 1, are for example, aryl radicals and halogenated aryl radicals such as phenyl, naphthyl, chlorophenyl, etc.; aralkyl radicals, such as phenylethyl, benzyl, etc.; aliphatic radicals such as methyl, ethyl, vinyl, propyl, allyl; haloaliphatic radicals such as chloromethyl, trifluoropropyl; cycloaliphatic radicals such as cyclohexyl, cycloheptyl, etc. Radicals included by R' of Formula 2 are cyanoalkyl radicals such as $\beta$-cyanoethyl, $\gamma$-cyanopropyl, $\delta$-cyanobutyl, etc. Where R, R' and R'' in Formula 1 represent more than one radical, these radicals can be all the same, or any two or more of the aforementioned radicals respectively.

The organopolysiloxane compositions convertible to the cured solid elastic state which are included within the scope of the present invention, can be cured with heat activated free radical initiators. Room temperature vulcanizing compositions also are included, which utilize either organosilicates, and metal soaps, as taught in Berridge Patent 2,843,555, assigned to the same assignee as the present invention, or certain curing agents which are activated by being exposed to the atmosphere. High energy electron irradiation without curing agents also can be employed, as taught by Lewis et al. Patent 2,763,706, assigned to the same assignee as the present invention.

Some of the organopolysiloxane polymers which can be utilized in the practice of the invention, are for example, silanol-terminated organopolysiloxanes consisting essentially of chemically combined diorganosiloxy units of Formula 1 and cyanoalkylsiloxy units of Formula 2. A method for making these silanol-terminated polymers is shown in the aforementioned French Patent 1,321,616. For example, one procedure that is taught is equilibrating organocyclopolysiloxane, such as octamethylcyclotetrasiloxane with cyanoalkylcyclopolysiloxane, such as 1,3,5,7 - tetramethyl-1,3,5,7-tetra-$\beta$-cyanoethylcyclotetrasiloxane, in the presence of a siloxane rearrangement catalyst, such as potassium hydroxide. The high molecular weight product which is formed can then be treated with water to reduce its molecular weight to a desirable viscosity, such as from 500 to 500,000 centipoises at 25° C.

Curing agents which can be employed in combination with the above described silanol-terminated organopolysiloxanes consisting essentially of chemically combined units of Formula 1 and Formula 2 are, for example, organosilicates, $(R'''O)_4Si$, where $R'''$ is an alkyl radical having from 1 to 8 carbon atoms. Some of the organosilicates which can be used are, for example, ethylorthosilicate, or polysilicate, etc. These organosilicates can be employed in combination with certain metallic salts of carboxylic acids such as salts of naphthenic acid, for example, the lead, tin, zirconium, etc. salts. The so called "one package" compositions can be made by utilizing hydrolyzable silanes such as organotrisamino-silanes, for example, methyl-tris-(dimethylamino)-silane, organo-trisaminoxysilanes, methyl-tris - (N,N - diethylaminoxy)-silane, etc. Curing agents shown by Meals Patent 3,269,982, assigned to the same assignee as the present invention, for example, organo-tris-isothiocyanatosilane, such as methyl-tris-isothiocyanatosilane, etc. There can be employed, for example, from about 2 to about 20 parts of curing agent, per 100 parts of polymer. Depending upon the nature of the curing agent employed, various fillers also can be utilized in combination with the above described room temperature vulcanizing compositions of the present invention, such as silica fillers, for example, fumed silica, diatomaceous earth, etc., and materials such as carbon black, titanium oxide, iron oxide, etc. A proportion of between about 10 to 300 parts of filler can be employed, and preferably betwen about 20 to 100 parts, per 100 parts of polymer.

In addition to the above described silanol chain-stopped organopolysiloxanes which can be used in the production of room temperature vulcanizing organopolysiloxane composition, of the present invention, there also can be employed organopolysiloxanes having a viscosity of at least 100,000 centipoises at 25° C. of the formula, (3) 

where R and R' are as defined above, $b$ has a value of 0.2 to 1.92 inclusive, has a value equal to 0.1 to 1.82 inclusive, and the sum of $b$ and $c$ is equal to 1.95 to 2.01 inclusive. The organopolysiloxanes of Formula 3 can be highly viscous masses, or gummy solids, dependent upon the state of condensation, which can be prepared by the alkaline metal catalyzed polymerization of lower molecular weight organocyclopolysiloxanes.

Methods for making some of the organopolysiloxanes of Formula 3, are well known in the art, and are shown, for example, by Prober Patent 3,185,663 assigned to the same assignee as the present invention. The starting organopolysiloxanes are used to make the organopolysiloxane polymers of Formula 3 consist essentially of units of Formula 1 and Formula 2. For example, there can be employed octamethylcyclotetrasilixane consisting essentially of chemically combined dimethylsiloxy units which can be equilibrated with 1,3,5,7-tetramethyl-1,3,5,7-tetra-$\beta$-cyanoethylcyclotetrasiloxane along with a chain-stopping radical, such as $R_3SiO$, where R can be, for example, methyl or vinyl, such as trimethylsiloxy or dimethylvinylsiloxy units, or $R'R_2SiO$ units can be employed such as dimethyl-$\beta$-cyanoethylsiloxy units. Where alkenyl radicals are attached to silicon by carbon-silicon linkages in the polymers of Formula 3, it is preferable that alkenyl radicals, such as vinyl radicals, can be present in an amount equal to from 0.05 to 2 mole percent of the total number of organic radicals in the organopolysiloxane polymer.

Fillers, which can be utilized in amounts of from 10 to 300 parts, per 100 parts of polymer, can be employed as mixtures, such as from 10 to 100 parts of reinforcing fillers, such as fumed silica, precipitated silica, etc., in combination with from 1 to 200 parts of semi-reinforcing fillers, such as perlite, diatomaceous earth, titanium oxide, etc. In addition, various additives such as heat stabilizers, for example, iron oxide, rare earth octoate, or aryl urethanes, in amounts of about from 0.01 to 8 parts of heat stabilizer, per 100 parts of polymer can be employed. Structure reducing additives, such as silanol-stopped polydiorganosiloxanes, diphenylsilanediol, alkoxy terminated polydiorganosiloxanes, silazanes, etc., also can be utilized.

The heat curable organopolysiloxane compositions of the present invention can be made by blending together, such as by milling or mixing with a dough mixer, the organopolysiloxane polymer of Formula 3, along with the zinc carbonate and other ingredients desired. Preferably, zinc carbonate is utilized at from about 0.5 part to 7.5 parts, per 100 parts of polymer. The order of addition of the various components is not critical. If desired, a curing catalyst such as benzoyl peroxide, tertiary-butyl perbenzoate, bis(2,4-dichlorobenzoyl)-peroxide, dicumyl peroxide, 2,5-dimethyl-2,5-ditertiary-butyl-peroxy-hexane, can be employed in amounts ranging from about 0.1 to as high as four percent by weight, based on the weight of the organopolysiloxane polymer. Thereafter the organopolysiloxane compositions can be molded at pressures from about 100 to 2,000 p.s.i. or more in combination with the temperatures ranging from about 100° C. to 300° C. or higher.

In instances where a room temperature vulcanizing composition is desired, a mixture of the silanol-terminated polymer consisting essentially of chemically combined units of Formulas 1 and 2, filler, curing agents and zinc carbonate, can be made by mixing the various ingredients in any desired manner. In instances where a one-package composition is desired, mixing must be accomplished under substantially anhydrous conditions, that is, no more than 100 parts of water, per million parts of mixture. If maintained under substantially anhydrous conditions, extended shelflife, such as up to 2 years or more, can be achieved.

In order that those skilled in the art will be better able to practice the invention, the following examples are given by way of illustration and not by way of limitation. All parts are by weight.

Example 1

A mixture of 101 parts of methyl-$\beta$-cyanoethylcyclosiloxane consisting essentially of chemically combined methyl-$\beta$-cyanoethylmethylsiloxy units, 100 parts of octamethylcyclotetrasiloxane, 0.36 part of 1,3,5,7-tetramethyl-1,3,5,7-tetravinylcyclotetrasiloxane, and 0.005 part of decamethyltetrasiloxane was heated for 3 hours in the presence of 0.001% by weight of the mixture of potassium hydroxide. Based on method of preparation, there was obtained an organopolysiloxane polymer consisting essentially of about 40 mole percent of methyl-$\beta$-cyanoethylsiloxy units chemically combined with about slightly less than about 60 mole percent of chemically combined dimethylsiloxy units, a minor amount of methylvinylsiloxy units, and chain-stopped with trimethylsiloxy units. The resulting polymer was decatalyzed by the method shown in Boot Patent 3,153,007, assigned to the same assignee as the present invention.

A compound was prepared by milling together 100 parts of the above polymer with 35 parts of fumed silica, 10 parts of diatomaceous earth, 6 parts of iron oxide, 5 parts of zinc carbonate, 2 parts of diphenylsilanediol and 1 part of dicumyl peroxide. A compound also was prepared following the same procedure, except that zinc carbonate was not added to the mixture.

Press cured slabs were prepared from the above compositions which were oven cured at 200° C. for four hours. The cured slabs were then placed in ASTM No. 3 oil for 70 hours at 300° F. The following table shows the results obtained where "H" is hardness (Shore A), "T" is tensile strength (p.s.i.), and "E" is elongation (percent):

| ZnCO$_3$ (parts) | 200° C. 4 hrs. oven cure | | | ASTM No. 3 oil 300° F., 70 hours | | |
|---|---|---|---|---|---|---|
| | H | T | E | H | T | E |
| 0 | 69 | 920 | 200 | 61 | 24 | 120 |
| 5 | 77 | 790 | 160 | 66 | 540 | 160 |

Example 2

In accordance with the procedure of Example 1, a mixture of 153 parts of methyl - $\beta$ - cyanoethylcyclosiloxane consisting essentially of chemically combined methyl-$\beta$-cyanoethylsiloxy units and 100 parts of octamethylcyclotetrasiloxane was equilibrated. Based on the method of preparation, there was obtained an organopolysiloxane polymer consisting essentially of about 50 mole percent of methyl-$\beta$-cyanoethylsiloxy units chemically combined with about 50 mole percent of dimethylsiloxy units and chain-stopped with trimethylsiloxy units.

A compound was made by milling together 3.2 parts of zinc carbonate, 40 parts of fumed silica, 4.6 parts of iron oxide, 3.2 parts of diphenylsilane diol, and 1 part of 2,5-dimethyl-2,5-ditertiary-butyl-peroxy-hexane, with 100 parts of the above polymer. Another compound was prepared following the same procedure utilizing 6.8 parts of zinc carbonate, per 100 parts of polymer. A third compound was prepared free of zinc carbonate.

Slabs of the above compounds were press-cured for 15 minutes at 190° C. and oven cured at 200° C. for four hours. The following table shows the results obtained when the oven cured slabs were placed in ASTM No. 3 oil for 70 hours at 300° F., where the terms employed, are as previously defined in Example 1.

| ZnCO₃ (Parts) | 200° C. 4 hrs. oven cure | | | ASTM No. 3 oil 300° F., hours | | |
|---|---|---|---|---|---|---|
| | H | T | E | H | T | E |
| 0 | 67 | 1,060 | 300 | 63 | 160 | 110 |
| 3.2 | 72 | 1,020 | 290 | 68 | 520 | 220 |
| 6.8 | 72 | 910 | 290 | 67 | 510 | 220 |

Example 3

A mixture of 226 parts of methyl-β-cyanoethylcyclosiloxane consisting essentially of chemically combined methyl-β-cyanoethylsiloxy units, 445 parts of octamethylcyclotetrasiloxane, and 5 parts of a dimethylpolysiloxane fluid containing about 10 mole percent of chemically combined trimethylsiloxy units is equilibrated with 8 parts of potassium hydroxide, per million parts of mixture for about 3 hours at a temperature of 200° C. The mixture is allowed to cool to 100° C. While the mixture is stirred, there is added 0.3 part of water. After stirring at a temperature of about 100° C. for 8 hours, there is obtained a fluid having a viscosity of about 840,000 centipoises at 25° C. The mixture is decatalyzed by the method of Example 1. Based on method of preparation, the fluid is a silanol-terminated organopolysiloxane consisting essentially of about 25 mole percent of methyl-β-cyanoethylsiloxy units and about 75 mole percent of dimethylsiloxy units.

A curable composition is prepared from the above polymer in accordance with the teaching of Meals Patent 3,269,982, assigned to the same assignee as the present invention. There is mixed together under substantially anhydrous conditions, 5 parts of phenyltriisothiocyanatosilane, 100 parts of the above silanol- terminated polymer, 30 parts of fumed silica, and 4.5 parts of zinc carbonate. A portion of the resulting curable mixture is poured into an aluminum cup to a depth of about 0.1 inch. It cures to a hard elastomer within 24 hours under atmospheric conditions. The same procedure is repeated except that an elastomer is made free of zinc carbonate.

Slabs are cut from the cured products obtained from the aforementioned room temperature vulcanizing mixtures and immersed in ASTM No. 3 oil for 70 hours at 300° F. It is found that the slab containing the zinc carbonate has superior tensile strength compared to the slab free of the zinc carbonate.

Example 4

A mixture of 20 parts of methyl-β-cyanoethylcyclopolysiloxane consisting essentially of chemically combined methyl-β-cyanoethylsiloxy units and 19.7 parts of octamethylcyclotetrasiloxane is heated to 110° C. While the mixture is stirring, there is added 8 parts of potassium hydroxide per million parts of mixture. The mixture is then heated to reflux at a temperature of about 175° C. Heating of the mixture is continued until the mixture becomes uniform. After an additional two hours of stirring and heating, the mixture is allowed to cool to 100° C. There is then added while stirring the mixture, 0.03 part of distilled water. The mixture is heated and stirred for about 3 hours. The mixture is then decatalyzed by the method of Example 1. Based on method of preparation, there is obtained a silanol-terminated organopolysiloxane consisting essentially of about 40 mole percent of chemically combined methyl-β-cyanoethylsiloxy units and 60 mole percent of dimethylsiloxy units.

There is mixed with 100 parts of the above silanol-terminated polymer, 25 parts of diatomaceous earth, 65 parts of iron oxide, and 5 parts of zinc carbonate. The composition cures at room temperature by the addition of 3 parts of ethyl silicate, and 0.4 part of dibutyltindilaurate. A composition also is prepared by the same procedure free of zinc carbonate.

A portion of each of the above room temperature vulcanizing organopolysiloxane compositions is poured into an aluminum cup to a depth of about 0.1 inch and allowed to cure for 24 hours at 25° C. Slabs of each of the compositions are then immersed in ASTM No. 3 oil for 70 hours at 300° F. It is found that the composition containing the zinc carbonate shows improved tensile (p.s.i.) over the compositon free of the zinc carbonate.

Example 5

A mixture of 14 parts of octamethylcyclotetrasiloxane, 86 parts of methyl-β-cyanoethylsiloxycyclopolysiloxane and $1 \times 10^{-2}$ parts of decamethyltetrasiloxane is heated to 110° C. While the mixture is stirring, there is added 8 partes of potassium hydroxide, per million of mixture. The mixture is then heated to reflux at a temperature of about 175° C. Heating of the mixture is continued until the mixture becomes uniform. There is then added about 1 part of tribromopropane and the mixture is stirred for an additional two hours at 175° C. Based on method of preparation, there is obtained a gum consisting essentially of about 80 mole percent of methyl-β-cyanoethylsiloxy units chemically combined with about 20 mole percent of dimethylsiloxy units and chain-stopped with trimethylsiloxy units.

A compound is prepared by milling together 0.5 part of zinc carbonate, 40 parts of fumed silica, 3.2 parts of diphenylsilanediol and 1 part of 2,5-dimethyl-2,5-ditertiary-butyl-peroxy-hexane, per 100 parts of the above polymer. Another compound is prepared following the same procedure free of zinc carbonate.

Slabs of the above compounds are press cured and oven cured in accordance with the procedure of Example 2. After immersion in ASTM No. 3 oil for 70 hours at 300° F., the elastomer containing the zinc carbonate is found to have superior physical properties than the elastomer free of zinc carbonate.

While the foregoing examples have of necessity been limited to only a few of the many variables within the scope of the present invention, it should be understood that the present invention is directed to a much broader class of organopolysiloxane compositions comprising organopolysiloxane polymer having cyanoalkyl radicals attached to silicon consisting essentially of diorganosiloxy units of Formula 1 chemically combined with cyanoalkylsiloxy units of Formula 2. All of these materials are prepared by methods specifically illustrated in the examples above and described further in the foregoing description of the present invention.

What I claim as new and desire to secure by Letters Patent of the United States is:

1. Organopolysiloxane compositions comprising by weight 100 parts of an organopolysiloxane having terminal radicals selected from the class consisting of R₃SiO and silanol radicals and consisting essentially of from about 10 to 95 mole percent of organosiloxy units consisting essentially of diorganosiloxy units of the formula,

chemically combined with from 5 to 90 mole percent of cyanoalkylsiloxy units, consisting essentially of organocyanoalkylsiloxy units of the formula,

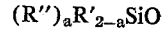

and (2) 0.1 to 10 parts of zinc carbonate, where $a$ is a whole number equal to 0 or 1, R is a member selected from the class consisting of monovalent hydrocarbon radicals and halogenated monovalent hydrocarbon radicals, R' is selected from cyanoalkyl radicals, and R" is a member selected from the class consisting of R radicals and R' radicals, where the average sum of R radicals and R' radicals per silicon atom of said organopolysiloxane has a value equal to from 1.95 to 2.01 inclusive.

2. A composition in accordance with claim 1, where the organopolysiloxane has a viscosity of at least 100,000 centipoises at 25° C. of the formula,

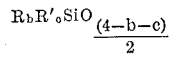

where R and R' are as defined in claim 1, $b$ has a value of 0.2 to 1.92 inclusive, $c$ has a value equal to 0.1 to 1.82 inclusive, and the sum of $b$ and $c$ is equal to 1.95 to 2.01 inclusive.

3. A room temperature vulcanizing composition, in accordance with claim 1 where the organopolysiloxane has terminal silanol radicals.

4. A heat curable organopolysiloxane composition in accordance with claim 2, containing an organic peroxide curing catalyst.

5. A composition in accordance with claim 1, containing a filler.

6. Organopolysiloxane composition in accordance with claim 1, comprising (1) 100 parts of an organopolysiloxane consisting essentially of from 10 to 95 mole percent of dimethylsiloxy units chemically combined with from 5 to 90 mole percent of methyl-β-cyanoethylsiloxy units and (2) from 0.5 to 7.5 parts of zinc carbonate.

7. A heat curable composition in accordance with claim 6 containing a filler and an organic peroxide curing catalyst.

8. A room temperature vulcanizing composition in accordance with claim 6.

9. A composition in accordance with claim 6, where the organopolysiloxane consists essentially of about 50 mole percent of methyl-β-cyanoethylsiloxy units chemically combined with about 50 mole percent of dimethylsiloxy units and chain-stopped with trimethylsiloxy units.

References Cited

UNITED STATES PATENTS 3,026,282  3/1962  Pike _____ 260—45.75

FOREIGN PATENTS 1,321,661  2/1963  France.

OTHER REFERENCES

Partington: A Textbook of Inorganic Chemistry, pp. 780, 781, 782 and 783, 6th ed., 1950, Macmillan & Co., London.

DONALD E. CZAJA, *Primary Examiner.*

M. I. MARQUIS, *Assistant Examiner.*

U.S. Cl. X.R.

260—37, 46.5